(12) United States Patent
Downs

(10) Patent No.: US 7,207,409 B2
(45) Date of Patent: Apr. 24, 2007

(54) TWO SPEED ALL WHEEL DRIVE SYSTEM

(75) Inventor: James P. Downs, South Lyon, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 224 days.

(21) Appl. No.: 10/797,717

(22) Filed: Mar. 10, 2004

(65) Prior Publication Data

US 2005/0199437 A1    Sep. 15, 2005

(51) Int. Cl.
B60K 17/34    (2006.01)

(52) U.S. Cl. .................................. 180/248; 180/233

(58) Field of Classification Search ............... 180/233, 180/245, 247, 248, 249
See application file for complete search history.

(56) References Cited

U.S. PATENT DOCUMENTS

| | | | |
|---|---|---|---|
| 4,669,559 A | 6/1987 | Fukui | |
| 4,747,643 A * | 5/1988 | Lanzer | 303/2 |
| 4,781,265 A | 11/1988 | Weiler et al. | |
| 4,805,485 A | 2/1989 | Ida | |
| 4,872,525 A * | 10/1989 | Sommer | 180/197 |
| 5,045,036 A | 9/1991 | Reuter et al. | |
| 5,201,820 A * | 4/1993 | Hamada et al. | 180/233 |
| 6,513,615 B2 | 2/2003 | Bowen et al. | |
| 6,523,637 B1 | 2/2003 | Nakano et al. | |
| 6,568,519 B2 * | 5/2003 | Lovatt | 192/56.6 |
| 6,605,018 B2 | 8/2003 | Palazzolo | |
| 6,620,071 B1 | 9/2003 | Cook et al. | |
| 6,725,744 B2 * | 4/2004 | Palazzolo | 74/665 GC |
| 6,942,592 B1 * | 9/2005 | Haka | 475/311 |
| 2004/0129475 A1 * | 7/2004 | Forsyth et al. | 180/233 |
| 2005/0087380 A1 * | 4/2005 | Brown | 180/233 |

FOREIGN PATENT DOCUMENTS

| | | |
|---|---|---|
| DE | 29505682 | 4/1995 |
| EP | 0 590 265 | 4/1994 |
| EP | 1 355 209 | 10/2003 |
| GB | 2 366 549 | 3/2002 |

* cited by examiner

Primary Examiner—Anne Marie Boehler
(74) Attorney, Agent, or Firm—Harness, Dickey & Pierce, P.L.C.

(57) ABSTRACT

A two speed drive system for an all wheel drive vehicle includes a double planetary gear front differential and a power take-off unit transferring drive torque to a front wheel set and a rear wheel set of the vehicle. A rear differential connects the power take-off unit and the rear wheel set providing the drive torque to the rear wheel set. A two speed drive unit is positioned between the power take-off unit and the rear differential. The drive unit shifts between a high range drive operation and a low range drive operation. The drive unit may be mounted directly to either the power take-off unit or the rear differential.

18 Claims, 8 Drawing Sheets

TWO SPEED ALL WHEEL DRIVE SYSTEM

FIELD OF THE INVENTION

The present invention relates in general to vehicle power trains and more specifically to a design and method of manufacture for a multiple speed all wheel drive motor vehicle power train including a power take-off unit.

BACKGROUND OF THE INVENTION

Four (4) main types of automotive power trains, commonly known as full-time rear wheel drive systems, full-time front wheel drive systems, part-time four wheel drive systems, and all wheel drive systems are known. All-wheel drive systems are gaining popularity for their ability to deliver driving traction to all four vehicle wheels with undiminished vehicle speed. All-wheel drive systems, however, often suffer from the inability to vary the amount of torque delivered between the front and rear drive axles. Common systems have a single speed with continuous all-wheel drive. Common all-wheel drive systems therefore have limited or no capability to maximize drive torque for "off-road", snow, or similar driving conditions when greater drive torque at slower vehicle speeds is desirable.

All-wheel drive systems are known which use a power take-off unit (PTU) to distribute torque between the front and rear drive axles of a vehicle. Torque is normally distributed in a predetermined percentage, such as 40 percent to the front drive axles and 60 percent to the rear drive axles. Known PTU's do not provide the capability to both vary the amount of torque delivered between the front and rear drive axles and to provide different vehicle operational speed ranges. This includes the capability to provide, for example, a varying torque to the different drive axles and a low speed range for low traction driving conditions.

SUMMARY OF THE INVENTION

In one form, the present teachings provide a drive system for a vehicle having a transmission with an output for providing rotary power to each of a front set of wheels and a rear set of wheels. The drive system includes a first differential, a power take-off unit, a second differential and a two mode drive unit. The first differential is coupled to the output of the transmission and receives drive torque therefrom. The power take-off unit is operably coupled to the first differential. The second differential connects the power take-off unit to the rear wheel set and provides a portion of the drive torque to the rear wheel set. The two mode drive unit is positioned between the power take-off unit and the second differential and is operable to shift between a high range all-wheel drive operation and a low range all-wheel drive operation.

In another form, the present teachings provide a vehicle drive train having a first differential, a power take-off, a multi-speed gearbox and an axle with a second differential. The first differential is adapted to receive a rotary input from a vehicle transmission and has a first output, which is configured to drive a first set of vehicle wheels, and a second output. The power take-off has an input, which is coupled to the first differential and receives rotary power from the second output, and an output. The multi-speed gearbox has an input, which receives rotary power from the output of the power take-off unit, and an output. The multi-speed gearbox being operable in at least a first gear ratio and a second gear ratio. The second differential has an input that receives rotary power from the output of the multi-speed gearbox.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
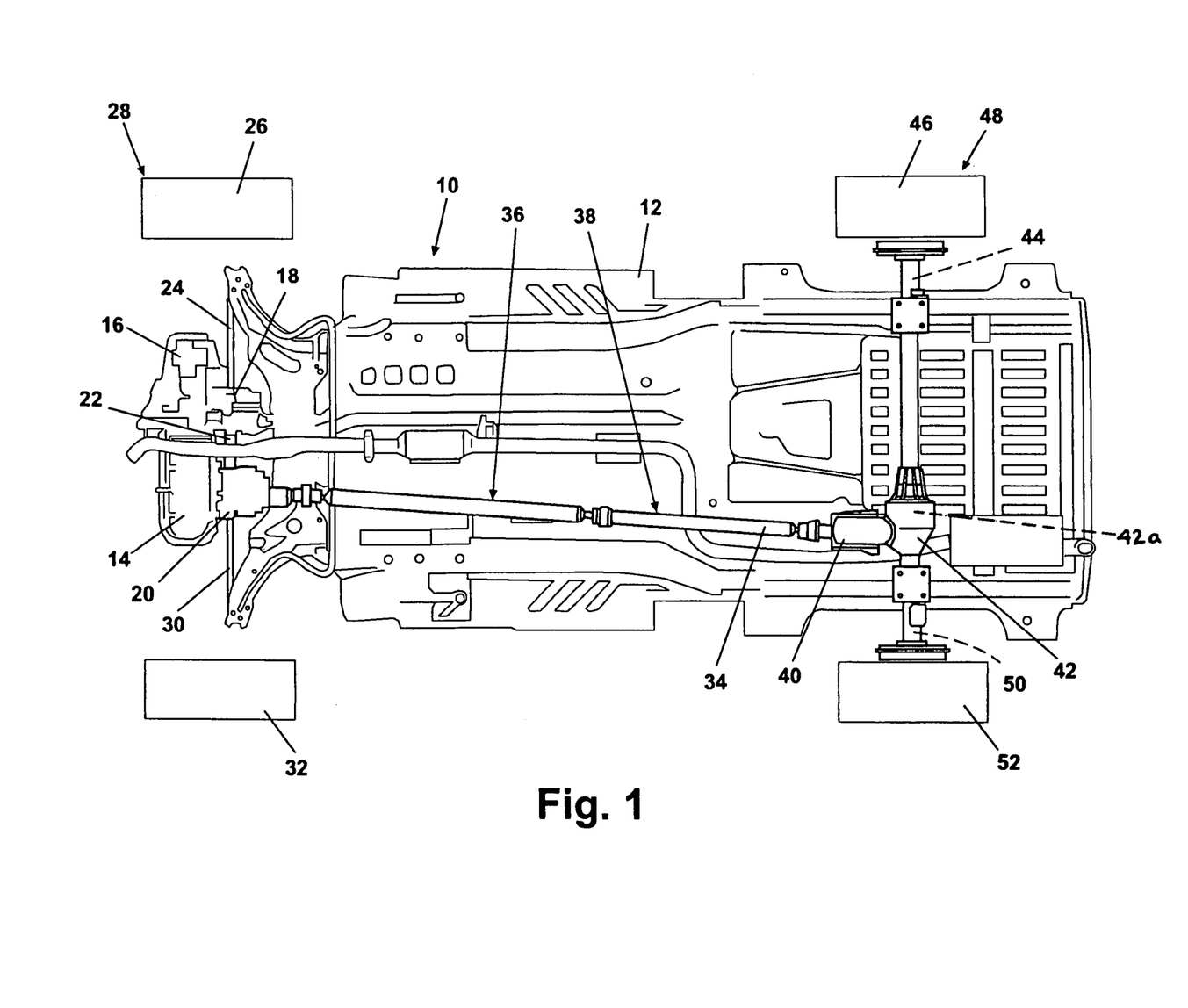
FIG. 1 is a partial plan view of an under surface of an automobile having a two speed all wheel drive system constructed in accordance with the teachings of the present invention.

With reference to FIG. 1, a two speed all wheel drive system 10, constructed in accordance with the teachings of the present invention, is shown in an exemplary installation viewed from an under surface of a vehicle 12. Vehicle 12 may include an engine 14, a transmission 16 and a drive train that may include a center differential 18 and a power take off unit (PTU) 20. A PTU input shaft 22 may connect center differential 18 to PTU 20. A left half shaft 24 may rotatably couple to center differential 18, providing rotating torque to a left front wheel 26 of a front wheel set 28. A right half shaft 30 may rotatably connect through PTU 20 to center differential 18 and provide drive torque to a right front wheel 32. Right front wheel 32 and left front wheel 26 both form front wheel set 28.

Drive torque is distributed from PTU 20 through a prop shaft 34 which may have a first shaft portion 36 and a second shaft portion 38, respectively, to a drive unit 40. Drive unit 40 may be directly mounted to a rear axle 42 of vehicle 12 as shown in the particular example provided. Rear axle 42 may include a differential 42*a*, a left rear axle shaft 44, which is coupled to the differential 42*a* and which transmits rotational torque to a left rear wheel 46 of a rear wheel set 48, and a right rear axle shaft 50, which is also coupled to the differential 42*a* and which transmits drive torque to a right rear wheel 52. Both right rear wheel 52 and left rear wheel 46 combine to form rear wheel set 48.

Figure 2:
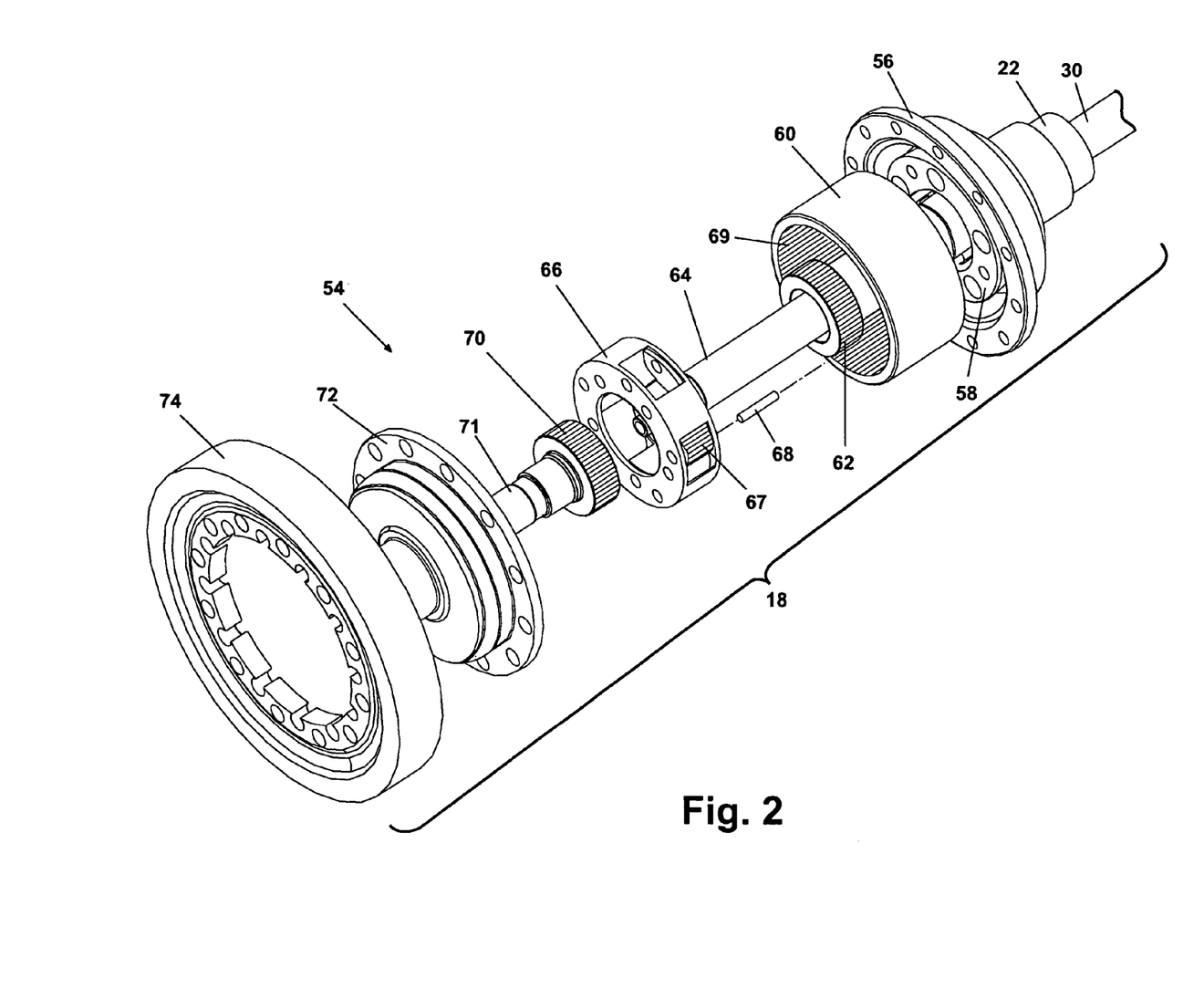
FIG. 2 is a perspective view of a portion of the two speed all wheel drive system of FIG. 1, showing the component parts of a center double planetary gear set differential.

With additional reference to FIG. 2, center differential 18 may include a double planetary gear differential assembly 54. Differential assembly 54 may include a case right half 56, an input planet carrier 58, an internal gear 60 providing front wheel drive input, a sun gear 62 rotatably disposed within internal gear 60, and a gear shaft 64. A planet carrier 66 may provide output torque to right front wheel 32 (shown in FIG. 1). Gear shaft 64, which forms a portion of right half shaft 30, may be coupled for rotation with planet carrier 66. Planet carrier 66 may include a plurality of planet gears 67 each rotatably connected to planet carrier 66 via a pin 68. Planet gears 67 may meshingly engage with a ring gear 69 of internal gear 60. Planet carrier 58 may also be provided with a plurality of planet gears (not shown) each connected to planet carrier 58 by a pin (not shown) to operatively create a double planetary gear set rotatably engageable with ring gear 69. A sun gear 70 may provide output torque to left front wheel 26 via a gear shaft 71, which forms a portion of left half shaft 24. Gear shaft 71 may be rotatably disposed in a case left half 72. An input gear 74 may provide input torque to differential assembly 54 directly from transmission 16. PTU input shaft 22 may be rotatably driven by rotation of sun gear 62.

Figure 3:
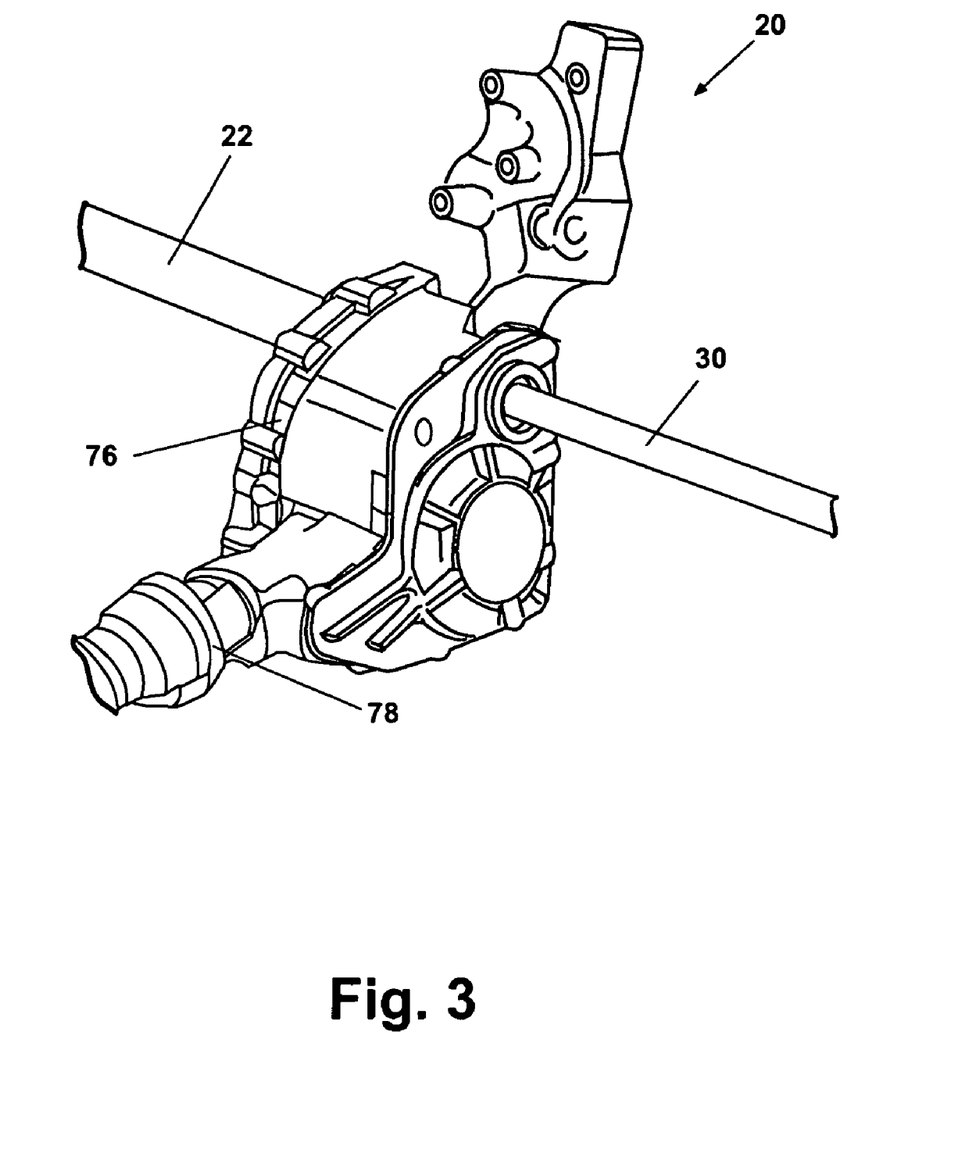
FIG. 3 is a perspective view of an exemplary power take-off unit constructed in accordance with the teachings of the present invention.
Figure 4:
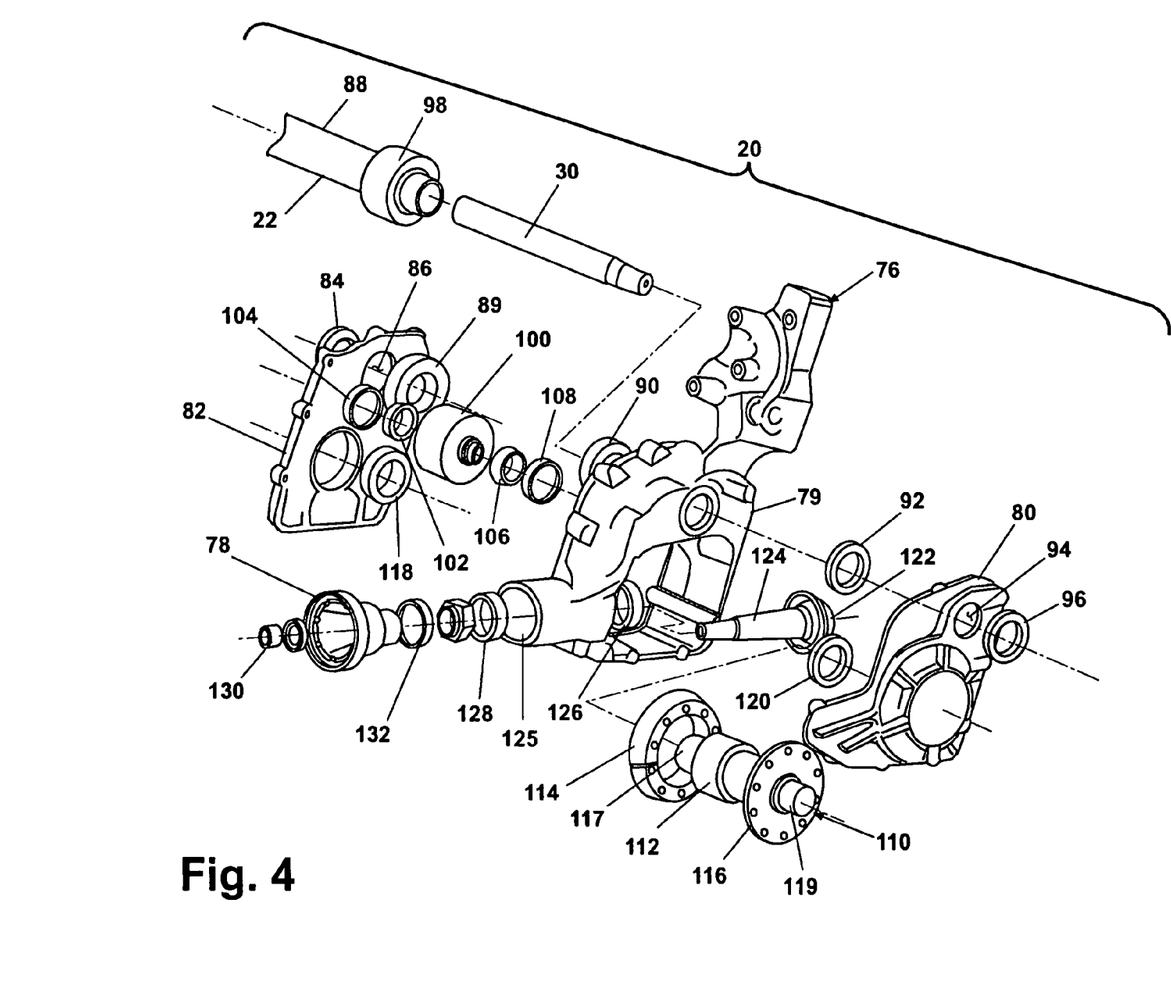
FIG. 4 is a perspective assembly view showing the component parts of the power take-off unit of FIG. 3.

With further reference to FIGS. 3 and 4, PTU 20 may include a PTU case 76 and a rear output connector 78. PTU input shaft 22 is shown at its connection to PTU case 76. Rear output connector 78 is fastenably connected to first shaft portion 36 of prop shaft 34, (FIG. 1). PTU case 76 may include a center case section 79, a first end plate 80 and a second end plate 82. An outer seal 84 may seal PTU input shaft 22 as PTU input shaft 22 penetrates an aperture 86 of second end plate 82. PTU input shaft 22 may include a hollow shaft portion 88 which provides internal rotational clearance for right half shaft 30 which may freely rotate and operatively pass through PTU 20 within hollow shaft portion 88. Hollow shaft portion 88 may be supported between second end plate 82 and center case section 79 by a first bearing 89 and a second bearing 90. Right half shaft 30 may penetrate center case section 79 and be supported between center case section 79 and first end plate 80 by a right half shaft bearing 92. Right half shaft 30 may penetrate first end plate 80 via an aperture 94 which may be provided with an outer seal 96. PTU input shaft 22 may also include a gear 98.

Within PTU 20, gear 98 may meshingly engage an idler gear 100. Idler gear 100 may be supported by an outer roller bearing 102 and a bearing race 104 to second end plate 82. Idler gear 100 may also be supported by an inner roller bearing 106 and a bearing race 108 to center case section 79. An output gear assembly 110 may be provided within center case section 79. Output gear assembly 110 may include an output gear 112, a hypoid ring gear 114, and a flange 116 which fastenably supports hypoid ring gear 114 to output gear assembly 110. A first end 117 of output gear assembly 110 may be supported by a bearing 118 at second end plate 82. Similarly, a second end 119 of output gear assembly 110 may be supported by a bearing 120 to first end plate 80. A mating hypoid pinion gear 122 meshingly engages hypoid ring gear 114. Hypoid pinion gear 122 may be supported on a rear output gear shaft 124 through a rear aperture 125 of center case section 79. Rear output gear shaft 124 may be rotatably supported within center case section 79 by a first bearing 126 and may be supported outside of center case section 79 by a second bearing 128. Rear output connector 78 may be splined to rear output gear shaft 124 and fastenably fixed to output gear shaft 124 by a fastener 130.

At least one seal 132 may also be positioned between rear output connector 78 and center case section 79 at rear aperture 125.

In the example provided, rotational torque may be applied to PTU input shaft 22 from sun gear 62 of center differential 18 (FIG. 2). Gear 98 of PTU input shaft 22 meshingly engages idler gear 100. Idler gear 100 in turn meshingly engages output gear 112. Rotation of output gear 112 rotates hypoid ring gear 114. Drive torque to rear wheel set 48 (FIG. 1) is provided by rotation of hypoid ring gear 114 and hypoid pinion gear 122 which rotates rear output gear shaft 124. Rotation of rear output gear shaft 124 rotates rear output connector 78 and thereby rotates prop shaft 34 (FIG. 1). Right half shaft 30 rotates within hollow shaft portion 88 of PTU input shaft 22 to provide drive torque directly to right front wheel 32 (FIG. 1).

Figure 5:
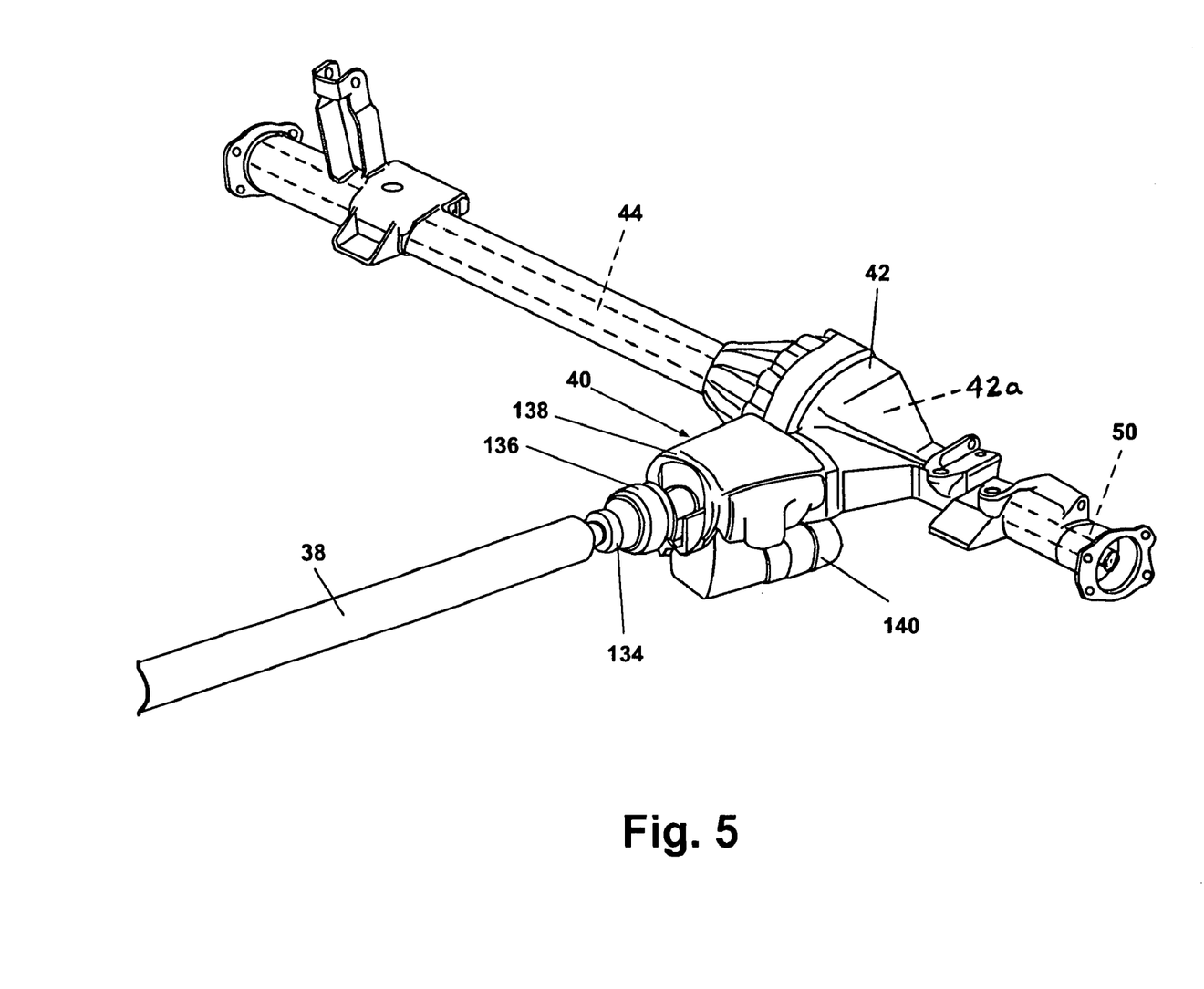
FIG. 5 is a perspective view of a rear axle assembly showing a drive unit directly mounted to a rear differential.

With reference to FIG. 5, a first connector half 134, which is coupled to prop shaft 34, may be coupled to a second connector half 136 that is associated with drive unit 40, to facilitate the transmission of rotary power from the prop shaft 34 to drive unit 40. Drive unit 40 may include a housing 138 that may be fastenably connected to the housing of the rear axle 42 (as best seen in reference to FIG. 7). A shift unit 140 may be coupled to housing 138. Drive torque may be transmitted via drive unit 40 through rear axle 42 to rear wheel set 48 (shown in FIG. 1). Shift unit 140 may include an electrical actuator that may be operated, for example, from an electric power source commonly provided by vehicle 12. An exemplary shift unit is manufactured by the Joseph Pollak Corporation of Boston, Mass. Shift unit 140 may include a linear actuator (not shown) which translates a shift fork 154 (described in further detail in reference to FIG. 6). Shifting of shift unit 140 is not limited to a linear actuator and may also be accomplished using a solenoid operator, a vacuum diaphragm, a hydraulic operator, a cable, etc. as one of ordinary skill in the art will readily appreciate in view of this disclosure.

Figure 6:
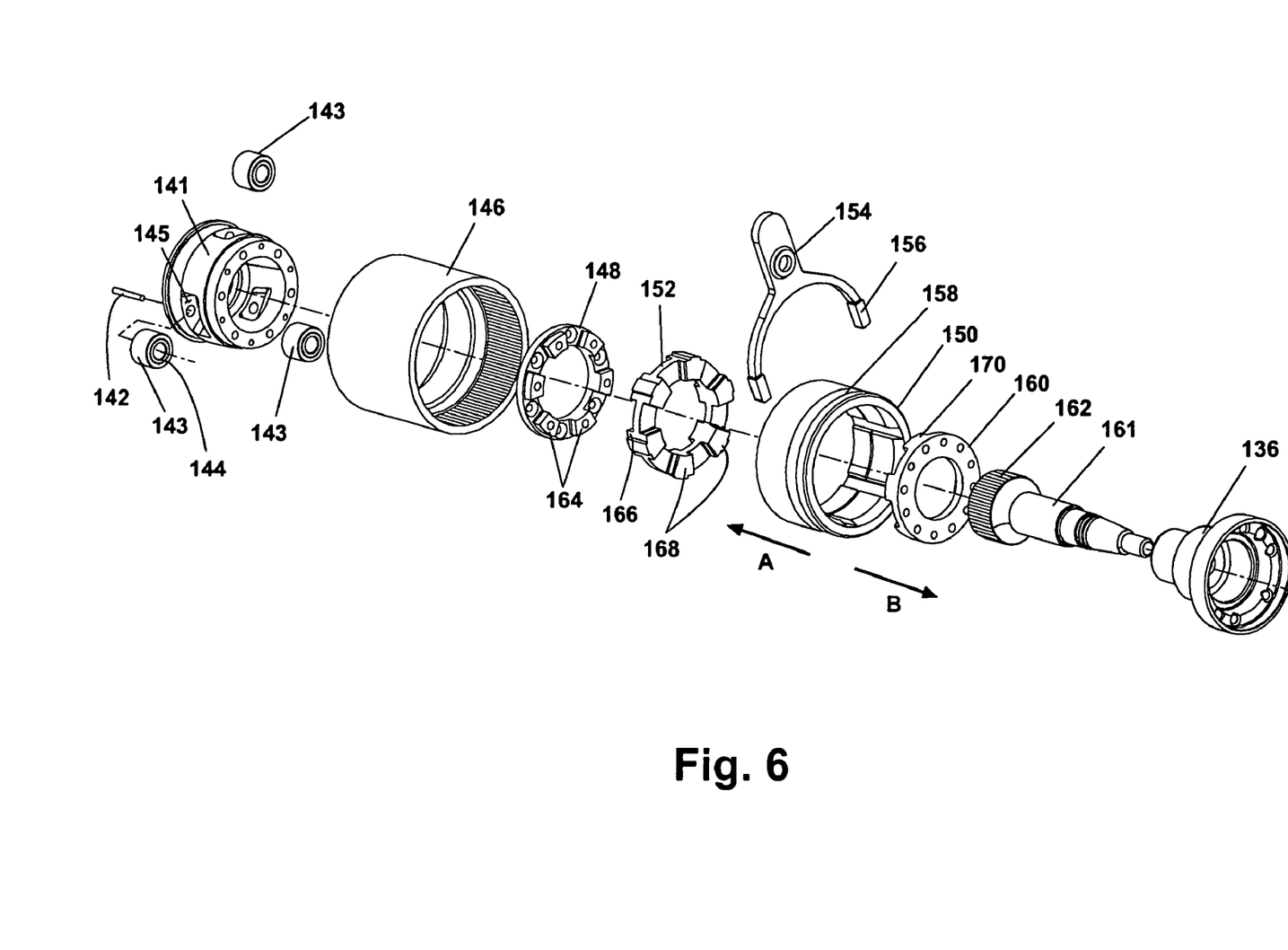
FIG. 6 is an exploded perspective view of a drive unit.

With reference to FIG. 6, drive unit 40 may include a planet carrier 141. Planet carrier 141 may include a plurality of pins 142, each supporting one of a plurality of planet gears 143 on a bearing 144. Planet carrier 141 may rotate within an internal gear 146. A first dog-ring plate 148 may be coupled for rotation with planet carrier 141. First dog-ring plate 148 may be connected by a plurality of fasteners (not shown) or otherwise fastenably connected to planet carrier 141. A shift collar 150 may meshingly engage internal gear 146 and may translate in either a shift direction "A" or a shift direction "B" within internal gear 146. A second dog-ring plate 152 may be fixedly connected to an interior surface of shift collar 150, for example by welding. A third dog-ring plate 160 may be fixedly coupled for rotation with second connector half 136. A sun gear shaft 161 may be coupled for rotation with second connector half 136 and may be disposed through each of third dog-ring plate 160, shift collar 150, second dog-ring plate 152, first dog-ring plate 148, internal gear 146, and planet carrier 141, where a sun gear 162 of sun gear shaft 161 meshingly engages the plurality of planet gears 143. Shift fork 154 may have a pair of tines 156 that may be disposed in an annular channel 158 of shift collar 150 such that displacement of shift fork 154 by shift unit 140 causes shift collar 150 to translate in either of shift direction "A" or shift direction "B".

Shift fork 154 may be displaced in shift direction "A" to translate shift collar 150 (and second dog-ring plate 152) into a position where a plurality of extensions 166 of second dog-ring plate 152 engage a plurality of mating extensions 164 of first dog-ring plate 148. Displacement in shift direction "A" locks internal gear 146 to planet carrier 141 to facilitate torque transmission between second connector half 136 and planet carrier 141 in a high range or relatively high speed ratio. This results in rotation of each of planet carrier 141, internal gear 146 and sun gear shaft 161.

Shift fork 154 may also be displaced in shift direction "B" to translate shift collar 150 (and second dog-ring plate 152) into a position where a plurality of extensions 168 on an opposite side of second dog-ring plate 152 engage a plurality of extensions 170 on third dog-ring plate 160. In this condition, internal gear 146 is locked in a stationary, non-rotating condition that permits planet gears 143 to perform a speed reduction and torque multiplication operation so that torque is transmitted between second connector half 136 and planet carrier 141 in a low range, or relatively low speed ratio.

Figure 7:
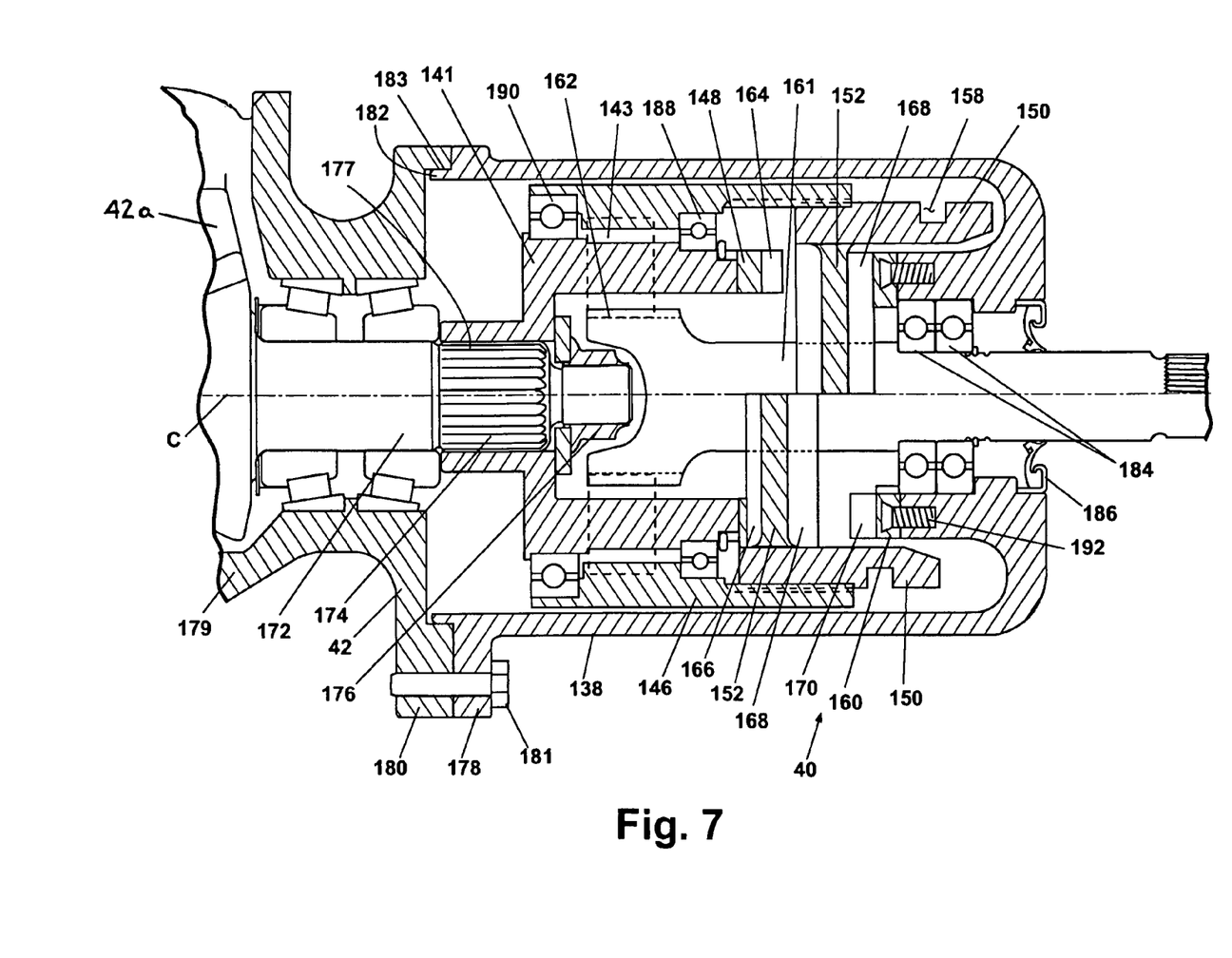
FIG. 7 is a cross sectional view of a drive unit.

In reference to FIG. 7, rear axle 42 may include an input pinion 172, which may have a splined input shaft 174, that transmits rotary power to the differential 42a in a manner that is well known in the art. Briefly, the input pinion 172 may transmit rotary power to a ring gear (not shown) of the differential 42a, which causes the differential 42a to rotate within the housing of the rear axle 42. A gear set (not shown), which may include a pair of side gears (not shown) and a plurality of pinions (not shown), may be employed to transmit rotary power to the left and right axle shafts 44 and 50 (FIG. 1). A fastener 176, such as a nut or a bolt, may be employed to fixedly, but removably couple planet carrier 141 to input shaft 174. Input shaft 174 may meshingly engage a mating internally splined portion 177 of planet carrier 141. Housing 138 may include a housing flange 178. An axle may be rotatably housed within a differential housing 179 that may include a differential flange 180. Housing flange 178 and differential flange 180 are fixedly, but removably coupled together using a plurality of fasteners 181. Housing 138 may also include a pilot feature 182 that slidably engages a mating feature 183 of differential flange 180, so as to permit various components of drive unit 40 and rear axle 42 (such as including input pinion 172) to be aligned about a common centerline "C".

Sun gear shaft 161 may be rotatably supported within housing 138 along common centerline "C" by a bearing set 184. A shaft seal 186 may be employed to seal an end junction of housing 138. Sun gear 162 of sun gear shaft 161 meshingly engages the plurality of planet gears 143. Planet gears 143 in turn rotatably engage an internally toothed surface of internal gear 146. Internal gear 146 is rotatably supported on an outer diameter of planet carrier 141 by a first bearing 188 and a second bearing 190. A plurality of fasteners 192 may be employed to fixedly, but removably couple third dog-ring plate 160 to a portion of housing 138.

FIG. 7 shows a configuration for drive unit 40 during the high range or high speed mode condition of operation in a portion of drive unit 40 below common centerline "C". The low range or low speed mode of operation configuration is shown above common centerline "C". In the high range operating condition, shift collar 150 is shifted such that second dog-ring plate 152 and first dog-ring plate 148 engage together. In this condition, second dog-ring extensions 166 engage with respective ones of first dog-ring extensions 164 such that input torque received via sun gear shaft 161 is transferred via planet gears 143 to internal gear 146, and from shift collar 150 to planet carrier 141. Planet carrier 141 thereby transmits high range torque via input pinion 172 to the ring gear (not shown) of differential 42a.

In the low range or low speed mode of operation shown above common centerline "C" in FIG. 7, shift collar 150 is displaced to the right as viewed in FIG. 7 which causes extensions 168 of second dog-ring plate 152 to engage respective ones of third dog-ring extensions 170 of third dog-ring plate 160. Because third dog-ring plate 160 is fixedly engaged to housing 138, internal gear 146 is thereby grounded via shift collar 150 to housing 138 and internal gear 146 cannot rotate. Rotational torque from sun gear shaft 161 is therefore transferred in low range via sun gear 162 to planet gears 143 and directly to planet carrier 141 such that planet carrier 141 is driven at a predetermined speed ratio relative to sun gear 162, such as at a 1:3 ratio.

With renewed reference to FIG. 6, output torque from engine 14 is transferred via transmission 16 to center differential 18, from center differential 18 to PTU 20 and therefrom to drive unit 40. Center differential 18 and PTU 20 operate in both high range and low range modes. All wheel drive system 10 in high range or high speed operating mode may split drive torque in a first front/rear percentage, such as approximately 67% to the front wheel set 28 (approximately evenly divided between each of left front wheel 26 and front right wheel 32) and approximately 33% to PTU 20. In high range or high speed operating mode, torque from PTU 20 is transferred via prop shaft 34 to drive unit 40. PTU 20 may have a gear ratio of 1:2.73. In the high range or high speed operating mode, shift unit 140 translates shift fork 154 in shift direction "A" (FIG. 6), drive torque is multiplied by a first ratio and is output via planet carrier 141 and input pinion 172 to the ring gear (not shown) of differential 42a where the transmission 16 torque may be approximately evenly divided between left rear wheel 46 and right rear wheel 52.

In the low range or low speed operating mode, two speed all wheel drive system 10 may split drive torque in a second front/rear percentage, such as approximately 38% to the front wheel set 28 (approximately evenly divided between each of left front wheel 26 and front right wheel 32) and approximately 62% to PTU 20. In the low range mode, shift unit 140 translates shift fork 154 in shift direction "B" (FIG. 6). Drive torque is multiplied by a second ratio and is output via planet carrier 141 and input pinion 172 to the ring gear (not shown) of rear differential 42a where the torque from PTU 20 may be approximately evenly divided between left rear wheel 46 and right rear wheel 52. By changing gear ratios via drive unit 40 on the rear wheel side of PTU 20, center differential 18 is effectively operated as a reduction gear set. In this example, front wheel set 28 receives approximately 67% of the transmission 16 torque and rear wheel set 48 receives approximately 108% of transmission 16 torque.

Figure 8:
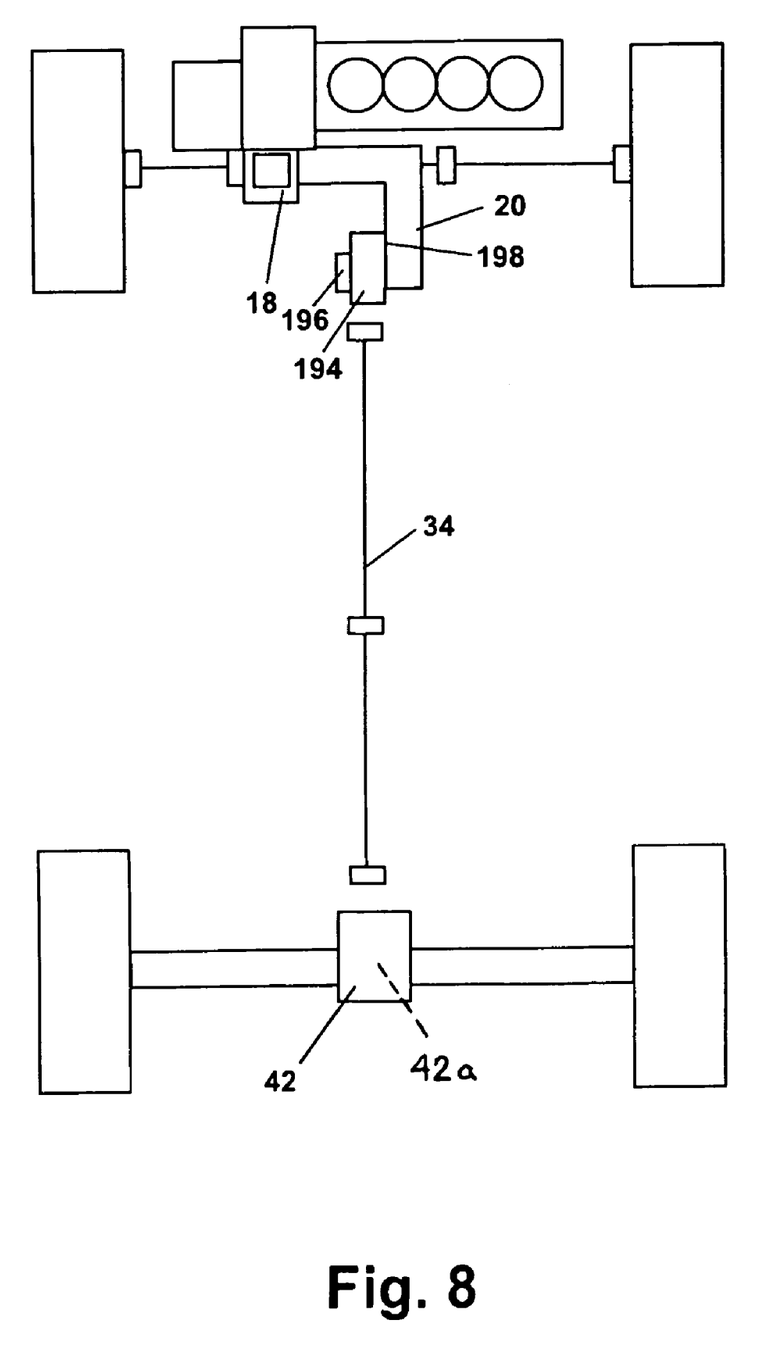
FIG. 8 is a schematic view showing another embodiment for a two speed all wheel drive system of the present invention.

Referring next to FIG. 8, in another preferred embodiment of the present invention, a drive unit 194, similar to drive unit 40, may be directly mounted to PTU 20. A shift unit 196, similar to shift unit 140, is mounted on drive unit 194 and operates similar to shift unit 140. A housing flange 198 (shown diagrammatically in this view only) is used to directly mate drive unit 194 to a mounting flange (not shown) of PTU 20. Drive unit 194 operates similar to drive unit 40 to provide either a high range/high speed operating mode or a low range/low speed operating mode.

Power take-off unit 20 may be operated as a single speed or a two speed unit. For example, PTU 20 may provide a two speed operation having a gear ratio of 1:0.61 in the low range all-wheel drive operation and a gear ratio of 1:2.73 in the high range all-wheel drive operation.

Two speed all wheel drive system 10 of the present invention is effective to provide both a high range/high speed and a low range/low speed operating mode for all wheel drive vehicles regardless of wheel slip conditions. This permits both on-road (high range operation) and off-road (low range operation) drivability without significant power loss and with no vehicle speed limitation in at least high range. Low range operation may be engaged with the vehicle stopped or at very low operating speed to protect drive train components. A vehicle speed lock-out system (not shown), known in the art, may also be used to prevent engagement of an all wheel drive system of the present invention from high range/high speed operation to low range/low speed operation at either a predetermined vehicle speed or to preclude operation at a vehicle speed greater than zero.

By providing drive units of the present invention located between the power take-off unit and the rear differential of an all wheel drive vehicle, additional arrangement space is freed up for the engine compartment of the vehicle and effective two speed operation of the all wheel drive vehicle is provided. Left rear axle shaft 44 and right rear axle shaft 50 in the example shown in FIG. 1 form a solid rear axle assembly. The invention is not limited to the configuration shown in FIG. 1. The invention may also be applicable to independent suspension systems (not shown).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A drive system for a vehicle, the vehicle having a transmission with an output for providing rotary power to each of a front and a rear set of wheels, the drive system comprising:
    a first differential operably connected to the output of the transmission and operable to receive a drive torque;
    a power take-off unit operably connected to the first differential;
    a second differential connecting the power take-off unit to the rear wheel set and operable to provide the drive torque to the rear wheel set;
    an input pinion extending outwardly from the second differential, the input pinion including a splined shaft;
    a two mode drive unit having a flange to directly connect the two mode drive unit to the second differential, the two mode drive unit further including a planet carrier directly connected to the splined shaft and operable to rotate the input pinion;
    wherein the two mode drive unit is operable to shift between a high range all-wheel drive operation and a low range all-wheel drive operation.

2. The system of claim 1, wherein the two mode drive unit comprises a mechanical connector operable to directly mount the two mode drive unit to the second differential, the mechanical connector including a pilot element.

3. The system of claim 2, comprising a prop shaft operably connected between the power take-off unit and the two mode drive unit.

4. The drive system of claim 1, wherein the two mode drive unit comprises a mechanical connector operable to directly mount the two mode drive unit to the power take-off unit.

5. The system of claim 4, comprising a prop shaft operably connecting the two mode drive unit and the second differential.

6. The system of claim 1, wherein the two mode drive unit comprises a shift device operable to shift between the high range all-wheel drive operation and the low range all-wheel drive operation.

7. A drive system for a vehicle, the vehicle having a transmission with an output for providing rotary power to each of a front and a rear set of wheels, the drive system comprising:
    a first differential operably connected to the output of the transmission and operable to receive a drive torque;
    a power take-off unit operably connected to the first differential;
    a second differential connecting the power take-off unit to the rear wheel set and operable to provide the drive torque to the rear wheel set;
    a two mode drive unit operably positioned between the power take-off unit and the second differential;
    wherein the two mode drive unit is operable to shift between a high range all-wheel drive operation and a low range all-wheel drive operation; and
    at least a pair of planetary gear sets disposed in the first differential;
    wherein the planetary gear sets operably function as a gear reduction unit when in the low range all-wheel drive operation.

8. A drive train for a vehicle, the vehicle having a transmission with an output for providing rotary power to each of a first and a second set of wheels, the drive train comprising:
    a first differential operable to receive the rotary power from the transmission and split the rotary power into a first portion operable to drive the first set of wheels and a second portion;
    a power take-off unit operable to receive the second portion of the rotary power from the first differential;
    a second differential operable to rotate the second set of wheels;
    a drive unit operably connectable between the power take-off unit and the second differential;
    a plurality of drive unit gears operable to provide at least a first mode having the second portion multiplied by a first predetermined gear ratio and a second mode having the second portion multiplied by a second predetermined gear ratio;
    a shift collar within the drive unit operable to select between the first mode and the second mode;
    a plurality of engagement plates operable to engage selected ones of the plurality of drive unit gears;
    an internal gear slidably joined to the shift collar;
    a planet carrier rotatable within the internal gear;
    a plurality of planet gears positionable about the planet carrier;
    a first dog-ring plate fixedly connected to the planet carrier; and
    a second dog-ring plate fixedly connected to the shift collar;
    wherein the shift collar is operably movable to engage selected ones of the engagement plates in each of a first collar position corresponding to the first mode and a second collar position corresponding to the second mode; and
    wherein the first collar position defines the first mode having the first dog-ring plate operably engaged with the second dog-ring plate.

9. The drive train of claim 8, further comprising:
    a housing containing the plurality of drive unit gears;
    a third dog-ring plate fixedly connected to the housing;

wherein the second collar position defines the second mode having the second dog-ring plate operably connected to the third dog-ring plate.

10. A method for transferring drive train power in an all-wheel drive vehicle, the vehicle having a transmission connected via a front differential and a power take-off unit to a rear differential, the method comprising:
positioning a two mode drive unit between the power take-off unit and the rear differential;
directly mounting the drive unit to the vehicle rear differential using a drive unit flange having a pilot member both operably coupling with a receiving flange of the second differential;
transferring a vehicle drive torque from a planetary carrier of the drive unit to a directly connected input pinion of the second differential;
engaging a preselected group of gears within the drive unit to operably provide at least a first gear configuration and a second gear configuration; and
shifting the plurality of gears in the drive unit between one of the first gear configuration corresponding to a high speed mode and the second gear configuration corresponding to a low speed mode of operation for the all-wheel drive vehicle.

11. The method of claim 10, comprising remotely linking the drive unit to the vehicle rear differential using a prop shaft.

12. The method of claim 10, comprising dividing the vehicle drive torque between each of the vehicle rear differential and the vehicle front differential.

13. The method of claim 12, comprising changing a portion of the vehicle drive torque divided to each of the vehicle rear differential and the vehicle front differential.

14. A vehicle drivetrain comprising:
a first differential adapted to receive a rotary input from a vehicle transmission, the first differential having a first output and a second output, the first output being configured to drive a first set of vehicle wheels;
a power take-off unit having an input and an output, the input being coupled to the first differential and receiving rotary power from the second output;
a multi-speed gearbox having an input and an output, the input of the multi-speed gearbox receiving rotary power from the output of the power take-off unit, the multi-speed gearbox being operable in at least a first gear ratio and a second gear ratio;
the multi-speed gearbox includes an epicyclic gear set having a ring gear, a plurality of planet gears meshingly engaged with the ring gear, and wherein the input of the multi-speed gearbox is meshingly engaged with the plurality of planet gears; and
an axle having a second differential, the second differential having an input that receives rotary power from the output of the multi-speed gearbox;
wherein the ring gear is stationary relative to the input of the multi-speed gearbox when the multi-speed gearbox is operated in the first gear ratio.

15. The vehicle drivetrain of claim 14, wherein a prop shaft operably couples the output of the power take-off unit and the input of the multi-speed gearbox.

16. The vehicle drivetrain of claim 14, wherein a prop shaft operably couples the output of the multi-speed gearbox and the input of the second differential.

17. The vehicle drivetrain of claim 14, wherein the first differential employs an epicyclic gear set.

18. The vehicle drive train of claim 14, wherein the ring gear co-rotates with the input of the multi-speed gearbox when the multi-speed gearbox is operated in the second gear ratio.

* * * * *